United States Patent
Lin et al.

(10) Patent No.: US 10,205,387 B2
(45) Date of Patent: Feb. 12, 2019

(54) CHARGE PUMP CIRCUIT

(71) Applicant: SILICON INTEGRATED SYSTEMS CORP., Hsinchu (TW)

(72) Inventors: Wen-Chi Lin, Hsinchu (TW);
Cheng-Ta Wu, Hsinchu (TW);
Keng-Nan Chen, Hsinchu (TW)

(73) Assignee: SILICON INTEGRATED SYSTEMS CORP., Hsinchu (TW)

( * ) Notice: Subject to any disclaimer, the term of this patent is extended or adjusted under 35 U.S.C. 154(b) by 0 days.

(21) Appl. No.: 15/838,181

(22) Filed: Dec. 11, 2017

(65) Prior Publication Data

US 2018/0166986 A1  Jun. 14, 2018

(30) Foreign Application Priority Data

Dec. 14, 2016  (TW) .............................. 105141481 A

(51) Int. Cl.
*H02M 3/07* (2006.01)
(52) U.S. Cl.
CPC ............. *H02M 3/07* (2013.01); *H02M 3/073* (2013.01); *H02M 2003/075* (2013.01)
(58) Field of Classification Search
None
See application file for complete search history.

(56) References Cited

U.S. PATENT DOCUMENTS

| | | | | |
|---|---|---|---|---|
| 4,468,798 A | * | 8/1984 | Riebeek | H02M 3/073 327/100 |
| 6,388,506 B1 | * | 5/2002 | Voo | H02M 3/073 327/536 |
| 7,639,067 B1 | * | 12/2009 | Perisetty | H02M 3/073 326/41 |
| 2001/0020864 A1 | * | 9/2001 | Myono | H02M 3/07 327/536 |

(Continued)

*Primary Examiner* — Cassandra Cox
(74) *Attorney, Agent, or Firm* — Maschoff Brennan

(57) ABSTRACT

A charge pump circuit includes N boosting circuits, (N−2) switching circuits and a control circuit. A $k^{th}$ boosting circuit includes a unidirectional component and a capacitor. A positive terminal of the unidirectional component of the $k^{th}$ boosting circuit is electrically connected to a negative terminal of a unidirectional component of a $(k-1)^{th}$ boosting circuit. A first terminal of the capacitor of the $k^{th}$ boosting circuit is electrically connected to a negative terminal of the unidirectional component of the $k^{th}$ boosting circuit. A $(2i-1)^{th}$ switching circuit selectively conducts a current path from a $(2i-1)^{th}$ boosting circuit to a first clock terminal or to a ground terminal according to a control signal of the control circuit. A $(2i)^{th}$ switching circuit selectively conducts a current path from a $(2i)^{th}$ boosting circuit to a second clock terminal or to the ground terminal according to the control signal of the control circuit.

9 Claims, 4 Drawing Sheets

(56) References Cited

U.S. PATENT DOCUMENTS

| | | | | |
|---|---|---|---|---|
| 2005/0030087 A1* | 2/2005 | Guo | H02M 3/073 | 327/536 |
| 2005/0254313 A1* | 11/2005 | Kurihara | G11C 5/145 | 365/189.09 |
| 2005/0264343 A1* | 12/2005 | Nakamura | H02M 3/073 | 327/536 |
| 2007/0247081 A1* | 10/2007 | Pratlong | H02M 3/07 | 315/244 |
| 2008/0013349 A1* | 1/2008 | Yanagida | H02M 3/073 | 363/60 |
| 2008/0024198 A1* | 1/2008 | Bitonti | H02M 3/07 | 327/536 |
| 2009/0160532 A1* | 6/2009 | Wu | H02M 3/073 | 327/536 |
| 2010/0211132 A1* | 8/2010 | Nimmagadda | A61N 1/378 | 607/60 |
| 2010/0244791 A1* | 9/2010 | Nirschl | G11O 5/147 | 323/282 |
| 2011/0227633 A1* | 9/2011 | Mo | H02M 3/07 | 327/517 |
| 2011/0234284 A1* | 9/2011 | Kuwagata | H03K 3/0315 | 327/291 |
| 2012/0063244 A1* | 3/2012 | Kwon | G11C 5/145 | 365/189.07 |
| 2012/0262224 A1* | 10/2012 | Shao | H02M 3/073 | 327/536 |
| 2013/0127436 A1* | 5/2013 | Hu | G05F 3/02 | 323/304 |
| 2013/0229841 A1* | 9/2013 | Giuliano | H02M 3/07 | 363/60 |
| 2015/0137773 A1* | 5/2015 | Miller | H02M 3/073 | 323/234 |
| 2015/0303807 A1* | 10/2015 | Garvey | H02M 1/08 | 323/271 |
| 2016/0116925 A1* | 4/2016 | Freeman | H02M 3/33546 | 307/130 |
| 2017/0133842 A1* | 5/2017 | Freeman | H02J 1/00 | |
| 2018/0034363 A1* | 2/2018 | Giuliano | H02M 1/42 | |

* cited by examiner

CHARGE PUMP CIRCUIT

CROSS-REFERENCE TO RELATED APPLICATIONS

This non-provisional application claims priority under 35 U.S.C. § 119(a) on Patent Application No(s). 105141481 filed in Taiwan, R.O.C. on Dec. 14, 2016, the entire contents of which are hereby incorporated by reference.

TECHNICAL FIELD

The disclosure relates to a charge pump circuit, more particularly to a charge pump circuit with switching function.

BACKGROUND

Many electronic products require an operating voltage satisfying their specifications of voltage, so as to drive their internal circuits to achieve normal operations. In general, a charge pump is used as a booster to output a proper operating voltage to electronic products. For example, a charge pump is used to convert an input voltage having the low potential to a working voltage having a high potential. One of the conventional charge pumps is the Dickson charge pump.

Dickson charge pump is a multi-stage charge pump having a plurality of diodes and capacitors, with each capacitor being driven by a clock signal. An input voltage of Dickson charge pump will rise stage by stage, so as to provide high-potential output voltage to electronic products. However, the number of diodes and capacitors included in Dickson charge pump is fixed. That means the number of stages of Dickson charge pump is fixed. In such structure, Dickson charge pump only outputs a fixed operating voltage while an input voltage is input to Dickson charge pump. Dickson charge pump cannot regulate the potential of the operating voltage randomly according to the actual product requirements or specifications.

SUMMARY

A charge pump circuit is disclosed according to one embodiment of the present disclosure. The charge pump circuit includes N boost circuits, a control circuit and (N−2) switch circuits. N is a positive integer greater than 2. $k^{th}$ boost circuit of the N boost circuits includes an unidirectional component having a positive terminal and a negative terminal, with the positive terminal of the unidirectional component of the $k^{th}$ boost circuit electrically connected to the negative terminal of the unidirectional component of (k−1)$^{th}$ boost circuit; and a capacitor having a first terminal and a second terminal, with the first terminal electrically connected to the negative terminal of the unidirectional component of the $k^{th}$ boost circuit, k being a positive integer not greater than N. The control circuit is configured to provide at least one set of control signals. A (2i−1)$^{th}$ switch circuit of the (N−2) switch circuits electrically connected to a (2i−1)$^{th}$ boost circuit of the N boost circuits, the (2i−1)$^{th}$ switch circuit selectively forming a current path from the (2i−1)$^{th}$ boost circuit to a first clock terminal or another current path from the (2i−1)$^{th}$ boost circuit to a ground terminal according to the set of control signals, a 2i$^{th}$ switch circuit of the (N−2) switch circuits electrically connected to a 2i$^{th}$ boost circuit of the N boost circuits, the 2i$^{th}$ switch circuit selectively forming a current path from the 2i$^{th}$ boost circuit to a second clock terminal or forming another current path from the 2i$^{th}$ boost circuit to a ground terminal according to the set of control signals, and i being a positive integer less than N/2. The second terminal of the capacitor of a (N−1)$^{th}$ boost circuit of the N boost circuits is electrically connected to the second clock terminal, and the second terminal of the capacitor of a N$^{th}$ boost circuit of the N boost circuits is electrically connected to the ground terminal.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
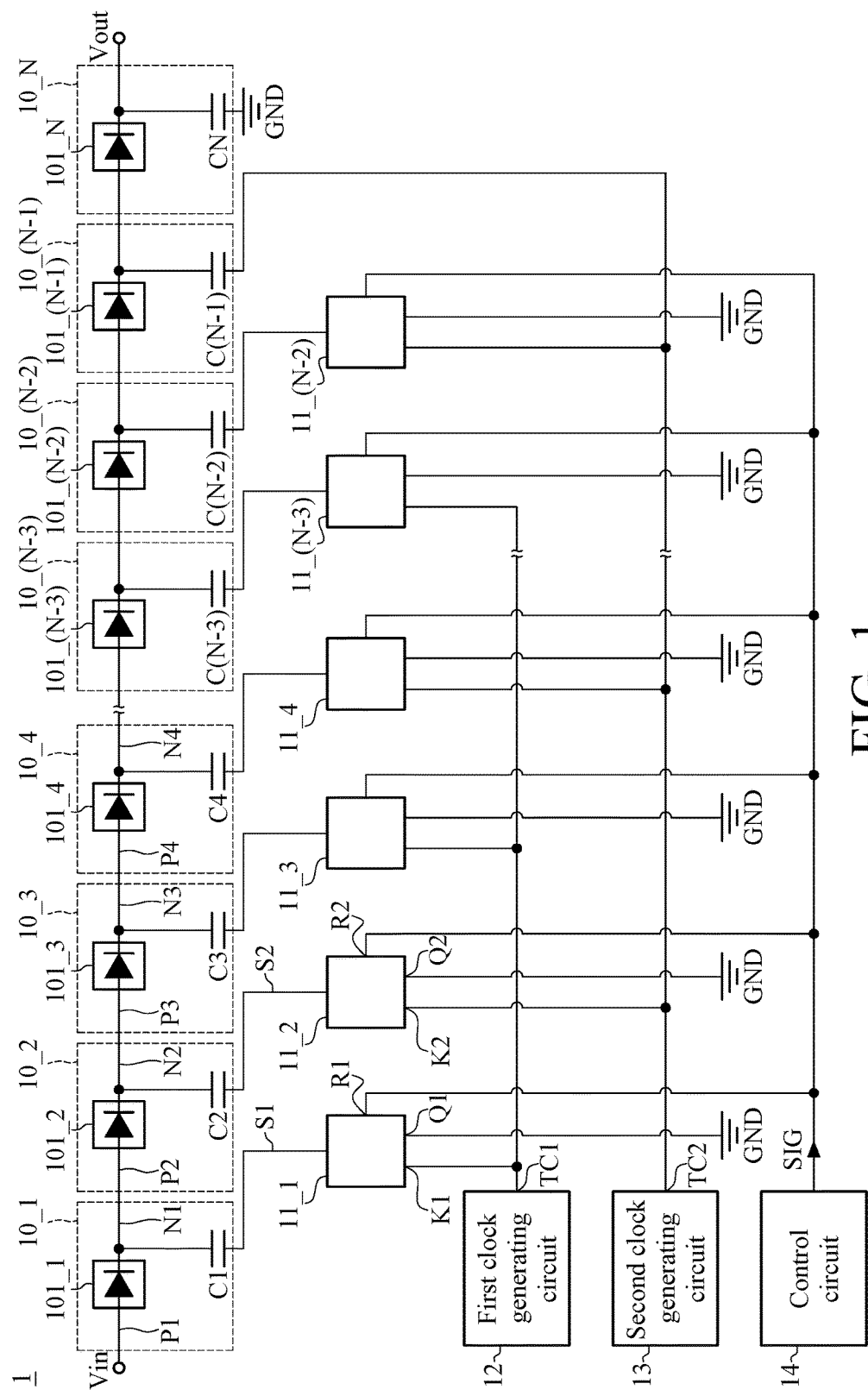
FIG. 1 is a circuit diagram of a charge pump according to one embodiment of the present disclosure.

Please refer to FIG. 1, which is a circuit diagram of a charge pump according to one embodiment of the present disclosure. As shown in FIG. 1, a charge pump 1 includes a plurality of boost circuits 10_1-10_N, a plurality of switch circuits 11_1-11_(N−2) and a control circuit 14. The boost circuit 10_1 includes an unidirectional component 101_1 and capacitor C1. The unidirectional component 101_1 has a positive terminal P1 and a negative terminal N1. The boost circuit 10_2 includes an unidirectional component 101_2 and capacitor C2. The unidirectional component 101_2 has a positive terminal P2 and a negative terminal N2. The boost circuit 10_3 includes an unidirectional component 101_3 and capacitor C3. The unidirectional component 101_3 has a positive terminal P3 and a negative terminal N3. The boost circuit 10_4 includes an unidirectional component 101_4 and capacitor C4. The unidirectional component 101_4 has a positive terminal P4 and a negative terminal N4. The remaining boost circuits 10_5-10_N respectively includes unidirectional components 101_(N−5)-101_N as well as capacitors C5-CN, and detailed description is not repeated here. In practice, the unidirectional components are electronic components having features of unidirectional conduction. In the embodiment of FIG. 1, the current is only allowed to flow from a positive terminal to a negative terminal.

Figure 2:
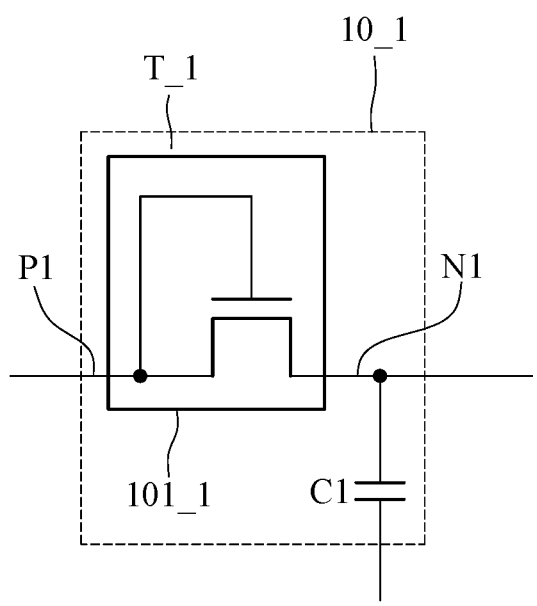
FIG. 2 is a schematic diagram of a unidirectional component according to one embodiment of the present disclosure.

In one embodiment, as shown in FIG. 1, each of the unidirectional components includes a diode. The boost circuit 10_2 is illustrated as an example. When the input voltage Vin is input to the boost circuit 10_1, the current is allowed to flow from the anode (positive terminal P1) of the diode to the cathode (negative terminal N1) of the diode only. In other embodiments, the unidirectional components are electronic component having features of unidirectional conduction, and the present disclosure is not limited to the embodiment of FIG. 1. Please refer to FIG. 1 as well as FIG. 2 which is a schematic diagram of a unidirectional component according to one embodiment of the present disclosure. As shown in FIG. 2, the unidirectional component 101_1 includes a transistor T_1, which is a diode-connected transistor having a gate and a drain connected to the gate. The diode-connected transistor has the feature of unidirectional conduction. It is comprehensible that the unidirectional component 101_1 including the transistor T_1 is used as an example for illustration. In fact, each of the rest of the unidirectional components 101_2-101_N may include a diode-connected transistor, as described above.

The positive terminal P2 of the unidirectional component 101_2 included in the boost circuit 10_2 is electrically connected to the negative terminal N1 of the unidirectional component 101_1 included in the boost circuit 10_1. The positive terminal P3 of the unidirectional component 101_3 included in the boost circuit 10_3 is electrically connected to the negative terminal N2 of the unidirectional component 101_2 included in the boost circuit 10_2. The positive terminal P4 of the unidirectional component 101_4 included in the boost circuit 10_4 is electrically connected to the negative terminal N3 of the unidirectional component 101_3 included in the boost circuit 10_3. The rest of boost circuits 10_5-10_N have similar connections as those boost circuits described above. In the embodiment of FIG. 1, the boost circuits 10_1-10_N has capacitors C1-CN respectively. Each of the capacitors C1-CN has a first terminal and a second terminal. The first terminals of the capacitors C1-CN are respectively and electrically connected to the negative terminals of the unidirectional components 101_1-101_N of the boost circuit 10_1-10_N. In practice, the capacitor CN included in the boost circuit 10_N is configured to stabilize the voltage of the whole system. In one embodiment, the capacitances of the capacitors C1-C(N−1) included in the boost circuit 10_1-10_(N−1) are substantially the same. In one embodiment, the capacitance of the capacitor CN included in the boost circuit 10_N is greater than the capacitances of the capacitors C1-C(N−1) included in the boost circuits 10_1-10_(N−1). In another embodiment, the capacitances of the capacitors C1-CN included in the boost circuits 10_1-10_N are incremental.

Figure 3:
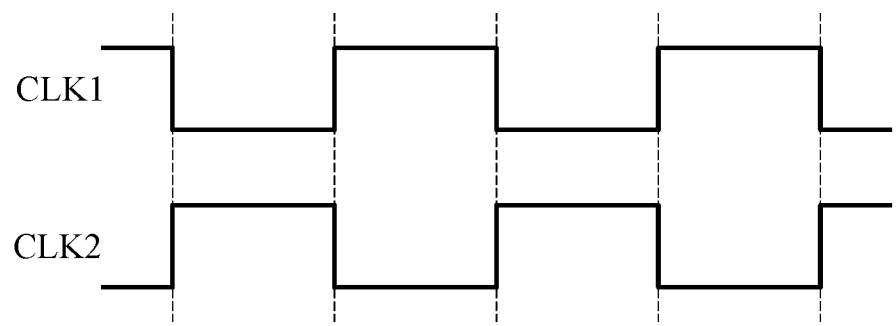
FIG. 3 is a diagram of a first clock signal and a second clock signal according to one embodiment of the present disclosure.
Figure 4:
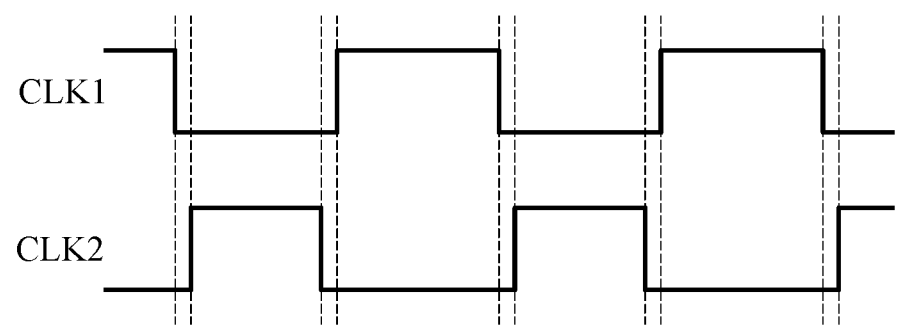
FIG. 4 is a diagram of a first clock signal and a second clock signal according to another embodiment of the present disclosure.

The first clock generating circuit 12 is electrically connected to the switch circuit 10_1 and switch circuits 10_3-10_(N−2), the switch circuits with odd numbers namely, and the first clock generating circuit 12 provides a first clock signal CLK1 through a first clock terminal TC1. The second clock generating circuit 13 is electrically connected to the switch circuit 10_2 and the switch circuit 10_4-10_(N−1), the switch circuits with even numbers namely, and the second clock generating circuit 13 provides a second clock signal CLK2 through a second clock terminal TC2. Specifically, assume the switch circuit 10_1 serves as a first switch circuit, the switch circuit 10_2 serves as a second switch circuit and so on. In this case, the first clock generating circuit 12 is electrically connected to odd switch circuits and the second clock generating circuit 13 is electrically connected to even switch circuits. Please refer to FIG. 3, which is a diagram of a first clock signal and a second clock signal according to one embodiment of the present disclosure. As shown in FIG. 3, the first clock signal CLK1 provided through the first clock terminal TC1 and the second clock signal CLK2 provided through the second clock terminal TC2 are inverted relative each other. Please refer to FIG. 4, which is a diagram showing the first clock signal and the second clock signal according to another embodiment of the present disclosure. As show in FIG. 4, the first clock signal CLK1 provided through the first clock terminal TC1 and the second clock signal CLK2 provided through the second clock terminal TC2 are separated from each other.

The control circuit 14 is electrically connected to the switch circuits 11_1-11_(N−2). The control circuit 14 is configured to provide a set of control signals SIG to the switch circuits 11_1-11_(N−2). In one example, the control circuit 14 is a logic circuit capable of performing complex calculation so as to generate signals to control external circuits. The second terminal of the capacitor C(N−1) included in the boost circuit 10_(N−1) is electrically connected to the second clock terminal TC2, and the second terminal of the capacitor CN included in the boost circuit 10_N is electrically connected to the ground terminal GND. The switch circuit 11_1 and the switch circuit 11_2 are electrically connected to the boost circuit 10_1 and the boost circuit 10_2 respectively. The switch circuit 11_1 selectively switches for forming a current path from the boost circuit 10_1 to the first clock terminal TC1 or another current path from the boost circuit 10_1 to the ground terminal GND according to the set of control signals SIG generated by the control circuit 14. The switch circuit 11_2 selectively switches for forming a current path from the boost circuit 10_2 to the second clock terminal TC2 or another current path from the boost circuit 10_2 to the ground terminal GND according to the set of control signals SIG generated by the control circuit 14. Specifically, the charge pump circuit of the present disclosure, by switching for forming the current path from the boost circuit to the clock terminal or to the ground terminal, regulates the output voltage Vout. The connections and switching methods regarding the rest of switches circuits 11_3-11_(N−2) are similar to those described above, so not repeated.

In practical manufacture process, a plurality of electronic products, such as digital microphones or other electronic devices requiring charges pumps, are divided into several batches, wherein the operating voltages required by those batches of electronic products may be different from each other. For example, the operating voltage required by the first batch of electronic products is approximately 11 volts, the operating voltage required by the second batch of electronic products is approximately 10 volts, and the operating voltage required by the third batch of electronic products is approximately 9 volts. By using the charge pump circuit of the present disclosure, the output voltages supplied to those batches of electronic products may be randomly regulated according to voltage requests corresponding to those electronic products, so that each batch of electronic products receive a respective operating voltage satisfying their specification for performing normal operations. In a practical example, assume that the operating voltage required by the first batch of electronic products is approximately 11 volts. In this case, the set of control signals SIG sent by the control circuit 14 controls the odd switch circuits 11_1-11_(N−2) to switch for forming the current path from the boost circuits 10_1-10_(N−2) to the first clock terminal TC1. It means that the odd switch circuits 11_1-11_(N−2) respectively conducts the current paths from all of the odd boost circuits 10_1-10_(N−2) to the first clock terminal TC1. Further, the even switch circuits 11_2-11_(N−1) switch for respectively forming the current path from the even boost circuits 10_2-10_(N−1) to the second clock terminal TC2. It means that the even switch circuits 11_2-

11_(N−1) respectively conduct the current paths from all of the even boost circuits 10_2-10_(N−1) to the second clock terminal TC2. In this case, the output voltage Vout output by the charge pump circuit 1 is approximately 11 volts, which satisfies the specification of operating voltage required by the first batch of electronic products. In another example, it is assumed that the operating voltage required by the second batch of electronic products is approximately 10 volts, which is slightly lower than the operating voltage required by the first batch of electronic products. In this case, the control circuit 14 sends the set of control signals SIG to respectively switch the current paths from part of the boost circuits 10_1-10_(N−2) to the first clock terminal TC1 as well as the current paths from part of the boost circuits 10_2-1_(N−1) to the second clock terminal TC2.

More specifically, in order to output a proper output voltage Vout serving as the operating voltage of the second batch of electronic products, the charge pump circuit 1 may control the switch circuit 11_1 to switch for forming the current path from the boost circuit 10_1 to the ground terminal GND according to the set of control signals SIG. It means that the current path from the boost circuit 10_1 to the ground terminal GND is conducted. Further, the charge pump circuit 1 may control the switch circuit 11_2 to switch for forming the current path from the boost circuit 10_2 to the ground terminal GND. It means that the current path from the boost circuit 10_2 to the ground terminal GND is conducted. The current paths from the remaining odd boost circuits 10_3-10_(N−2) to first clock terminal TC1 keep being conducted and the current paths from the remaining even boost circuits 10_4-10_(N−1) to the second clock terminal TC2 keeps being conducted as well. In this case, comparing to the example regarding the first batch of electronic products, the output voltage Vout provided by the charge pump circuit 1 is approximately 10 volts, which satisfies the specification of operating voltage required by the second batch of electronic products.

Assume that there is a third batch of electronic products requiring the operating voltage of 9 volts lower than the operating voltage required by the second batch of electronic products. Persons having ordinary skills in the art may be able to understand it is possible that the charge pump circuit 1 adapted to the second batch of electronic products may further control the switch circuit 11_3 to switch for forming the current path from the boost circuit 10_3 to the ground terminal GND according to the set of control signals SIG. It means that the current path from the boost circuit 10_3 to the ground terminal GND is conducted. Further, the charge pump circuit 1 may control the switch circuit 11_4 to switch for forming the current path from the boost circuit 10_4 to the ground terminal GND according to the set of signals SIG. It means that the current path from the boost circuit 10_4 to the ground terminal GND is conducted. The current paths from the remaining odd boost circuits 10_5-10_(N−2) to the first clock terminal TC1 keep being conducted and the current paths from the remaining even boost circuits 10_6-10_(N−1) to the second clock terminal TC2 keep being conducted as well. Therefore, the charge pump circuit 1 is capable of outputting a relatively lower output voltage Vout of 9 volts serving as an operating voltage required by the third batch of electronic products. It is noted that the voltages of 9 volts, 10 volts and 11 volts mentioned in the previous paragraphs are for illustrations only, and the present disclosure is not limited to those voltage values.

In one embodiment, each of the switch circuits 11_1-11_(N−1) shown in FIG. 1 includes a multiplexer (MUX) configured to switch for forming current path from the boost circuit to the clock terminal or to the ground terminal according to the set of control signals. For example, as shown in FIG. 1, the switch circuit 11_1 has a first input terminal K1, a second input terminal Q1, an output terminal S1 and a receiving terminal R1. The first input terminal K1 is electrically connected to the first clock terminal TC1 of the first clock circuit 12. The second input terminal Q1 is electrically connected to the ground terminal GND. The output terminal S1 is electrically connected to the boost circuit 10_1. The receiving terminal R1 is electrically connected to the control circuit 14. The multiplexer included in the switch circuit 11_1 selectively conducts the current path from the boost circuit 10_1 to the first clock terminal TC1 or to the ground terminal GND according to the set of control signals sent by the control circuit 14. The switch circuit 11_2 has a first input terminal K2, a second input terminal Q2, an output terminal S2 and a receiving terminal R2. The first input terminal K2 is electrically connected to the second clock terminal TC2 of the first clock circuit 12. The second input terminal Q2 is electrically connected to the ground terminal GND. The output terminal S2 is electrically connected to the boost circuit 10_2. The receiving terminal R2 is electrically connected to the control circuit 14. The multiplexer included in the switch circuit 11_2 selectively conducts the current path from the boost circuit 10_2 to the second clock terminal TC2 or to the ground terminal GND according to the control signal sent by the control circuit 14. Similarly, the terminals, connections and operations of the multiplexer included in each of the switch circuits 11_3-11_(N−1) are similar to those of the multiplexer described above, so not repeated here.

Based on the above descriptions, the present disclosure provides the charge pump in which the switch circuit and the control circuit are disposed, with the switch circuit selectively conducts the current paths from part of boost circuits to the clock terminal or the ground terminal according to the set of control signals generated by the control circuit, so as to regulate the output voltage based on the number of current paths conducted.

What is claimed is:

1. A charge pump circuit, comprising:
   N boost circuits, with N being a positive integer greater than 2, and a $k^{th}$ boost circuit of the N boost circuits, with k being a positive integer not greater than N, wherein the $k^{th}$ boost circuit comprises:
   an unidirectional component having a positive terminal and a negative terminal, with the positive terminal of the unidirectional component of the $k^{th}$ boost circuit electrically connected to the negative terminal of the unidirectional component of a $(k-1)^{th}$ boost circuit; and
   a capacitor having a first terminal and a second terminal, with the first terminal electrically connected to the negative terminal of the unidirectional component of the $k^{th}$ boost circuit;
   a control circuit configured to provide at least one set of control signals; and
   (N−2) switch circuits, with a $(2i-1)^{th}$ switch circuit of the (N−2) switch circuits electrically connected to a $(2i-1)^{th}$ boost circuit of the N boost circuits, the $(2i-1)^{th}$ switch circuit selectively forming a current path from the $(2i-1)^{th}$ boost circuit to a first clock terminal or another current path from the $(2i-1)^{th}$ boost circuit to a ground terminal according to the set of control signals, a $2i^{th}$ switch circuit of the (N−2) switch circuits electrically connected to a $2i^{th}$ boost circuit of the N boost circuits, the $2i^{th}$ switch circuit selectively forming a current path from the $2i^{th}$ boost circuit to a second clock terminal or another current path from the $2i^{th}$ boost circuit to a ground terminal according to the set of control signals, and i being a positive integer less than N/2;

wherein the second terminal of the capacitor of a $(N-1)^{th}$ boost circuit of the N boost circuits is electrically connected to the second clock terminal, and the second terminal of the capacitor of a $N^{th}$ boost circuit of the N boost circuits is electrically connected to the ground terminal.

2. The charge pump circuit according to claim 1, wherein the first clock terminal provides a first clock signal, the second clock terminal provides a second clock signal, and the second clock signal and the first clock signal are inverted relative to each other.

3. The charge pump circuit according to claim 1, wherein the first clock terminal provides a first clock signal, the second clock terminal provides a second clock signal, and the second clock signal and the first clock signal are separated from each other.

4. The charge pump circuit according to claim 1, wherein each switch circuit comprises a multiplexer having a first input terminal, a second input terminal, an output terminal and a receiving terminal, the receiving terminal of the multiplexer of each switch circuit is electrically connected to the control circuit, the second input terminal of the multiplexer of each switch circuit is electrically connected to the ground terminal, the first input terminal of the multiplexer of the $(2i-1)^{th}$ switch circuit is electrically connected to the first clock terminal, the output terminal of the multiplexer of the $(2i-1)^{th}$ switch circuit is electrically connected to the $(2i-1)^{th}$ boost circuit, the first input terminal of the multiplexer of the $(2i)^{th}$ switch circuit is electrically connected to the second clock terminal, and the output terminal of the multiplexer of the $(2i)^{th}$ switch circuit is electrically connected to the $(2i)^{th}$ boost circuit.

5. The charge pump circuit according to claim 1, wherein the unidirectional component is a diode.

6. The charge pump circuit according to claim 1, wherein the unidirectional component is a diode-connected transistor.

7. The charge pump circuit according to claim 1, wherein a capacitance of the $N^{th}$ boost circuit is greater than a capacitance of the $(N-1)^{th}$ boost circuit.

8. The charge pump circuit according to claim 1, wherein capacitances of the first boost circuit to the $(N-1)^{th}$ boost circuit are substantially the same.

9. The charge pump circuit according to claim 1, wherein capacitances of the first boost circuit to the (N-1)th boost circuit are incremental.

* * * * *